United States Patent [19]

Herrera

[11] 4,263,840

[45] Apr. 28, 1981

[54] SAFETY BRAKE MECHANISM

[75] Inventor: Dan B. Herrera, Huntington Park, Calif.

[73] Assignee: Stratobrake Corporation, Winston-Salem, N.C.

[21] Appl. No.: 89,583

[22] Filed: Oct. 29, 1979

[51] Int. Cl.³ ............................................... F01B 7/00
[52] U.S. Cl. .......................................... 92/63; 92/64; 92/128; 92/130 A
[58] Field of Search ................. 92/63, 64, 52, 53, 129, 92/130 A, 128

[56] References Cited

U.S. PATENT DOCUMENTS

| 1,928,533 | 9/1933 | Goss | 92/53 |
|---|---|---|---|
| 3,101,219 | 8/1963 | Herrera | 92/63 |
| 3,187,642 | 6/1965 | Cruse | 92/63 |
| 3,244,079 | 4/1966 | Herrera | 92/63 |
| 3,424,062 | 1/1969 | Gummer | 92/129 |
| 3,439,585 | 4/1969 | Herrera | 92/130 A |

FOREIGN PATENT DOCUMENTS

| 608638 | 11/1960 | Canada | 92/129 |
|---|---|---|---|
| 180486 | 2/1935 | Sweden | 92/53 |

Primary Examiner—Abraham Hershkovitz
Attorney, Agent, or Firm—B. B. Olive

[57] ABSTRACT

An improved spring guide incorporating a collapsible telescoping sleeve assembly is used in conjunction with a conventional fluid pressure operated brake of the type having a safety brake mechanism which employs a spring powered brake actuator for automatic activation of the safety brake in case of an emergency or a pneumatic failure.

3 Claims, 5 Drawing Figures

SAFETY BRAKE MECHANISM

BACKGROUND OF THE INVENTION

1. Field of the Invention

The invention relates to air brakes and more particularly to an improved spring guide mechanism for the type of safety brake which does not require fluid pressure for activation.

2. Description of the Prior Art

Pneumatic operated brake systems are widespread, especially in the trucking industry. Applicant has been active in the field of safety brake mechanisms and U.S. Pat. Nos. 3,101,219, 3,244,079 and 3,439,585 are illustrative, both of applicant's contributions and what are believed to be the most advanced safety brake mechanisms available.

There is normally provided in combination with the conventional fluid pressure operated brake, an automatically operated safety or parking brake mechanism which is normally subjected to the same air pressure as is employed for operating the brake. Such air pressure is sufficient to maintain the auxiliary safety mechanism in its inoperative position. In the event of failure of the compressed air supply or reduction in pressure below a pre-selected value, a spring mechanism automatically operates to apply the brake and to hold it in the applied position until the air pressure is restored to its normal value. When the vehicle is parked and the air pressure is reduced or turned off entirely, the auxiliary mechanism operates automatically to apply the brakes until the air pressure is again brought up to the desired value. Further, when the vehicle is in operation and moving, a loss of air pressure will cause the auxiliary mechanism to automatically apply the brake and thus provide a safety feature.

The automatically operated auxiliary safety mechanism comprises a reciprocal plunger which is actuated in response to motion of a diaphragm produced by a compression spring, i.e., the barrel spring, against one side of the diaphragm. Normally, the same fluid pressure which operates the brake is applied against the opposite side of the diaphragm and maintains the barrel spring under compression and inoperative. Upon a loss or failure of pressure, the barrel spring causes displacement of the diaphragm and plunger and corresponding movement of the conventional brake mechanism, including the brake rod, to apply the brake.

The mentioned auxiliary safety mechanisms, as described above and as further illustrated in the mentioned prior patents, while representing an advance in the art, have not proven entirely satisfactory. For example, under some conditions of overhaul and maintenance, a premature release of the auxiliary safety mechanism plunger and its associated, exceptionally strong barrel spring has occurred resulting in physical damage and injury. Also, the plunger of the safety mechanism, after extended service, has become wobbly and the barrel spring has sometimes been allowed to assume a cocked position within the housing which prevents proper function of the brakes. Also, the prior art mechanisms have inherently introduced physical structure on the top housing surface which has presented an obstacle, both to maintenance and operation.

With the foregoing in mind, the present invention is primarily directed at providing an improved telescoping sleeve arrangement for the barrel spring so as to provide an overall safer type of safety brake mechanism particularly for maintenance and overall purposes and also to provide a flat obstacle-free top housing surface.

SUMMARY OF THE INVENTION

The main feature of the invention resides in the incorporation in the previously-described auxiliary mechanism of a telescoping collapsible sleeve arrangement designed to maintain the barrel spring in a substantially true centered axial relation with the diaphragm and associated plunger. The tendency of the plunger to wobble as encountered in prior art mechanisms is substantially reduced or eliminated and cocking of the barrel spring within the brake housing is prevented.

The telescoping spring guide arrangement of the invention also allows for a more compact unit with an obstacle free top housing surface which aids in installation of the unit. Premature release of the plunger and its normally strong barrel spring is prevented during maintenance and overhaul.

DESCRIPTION OF THE PREFERRED EMBODIMENT

Figure 1:
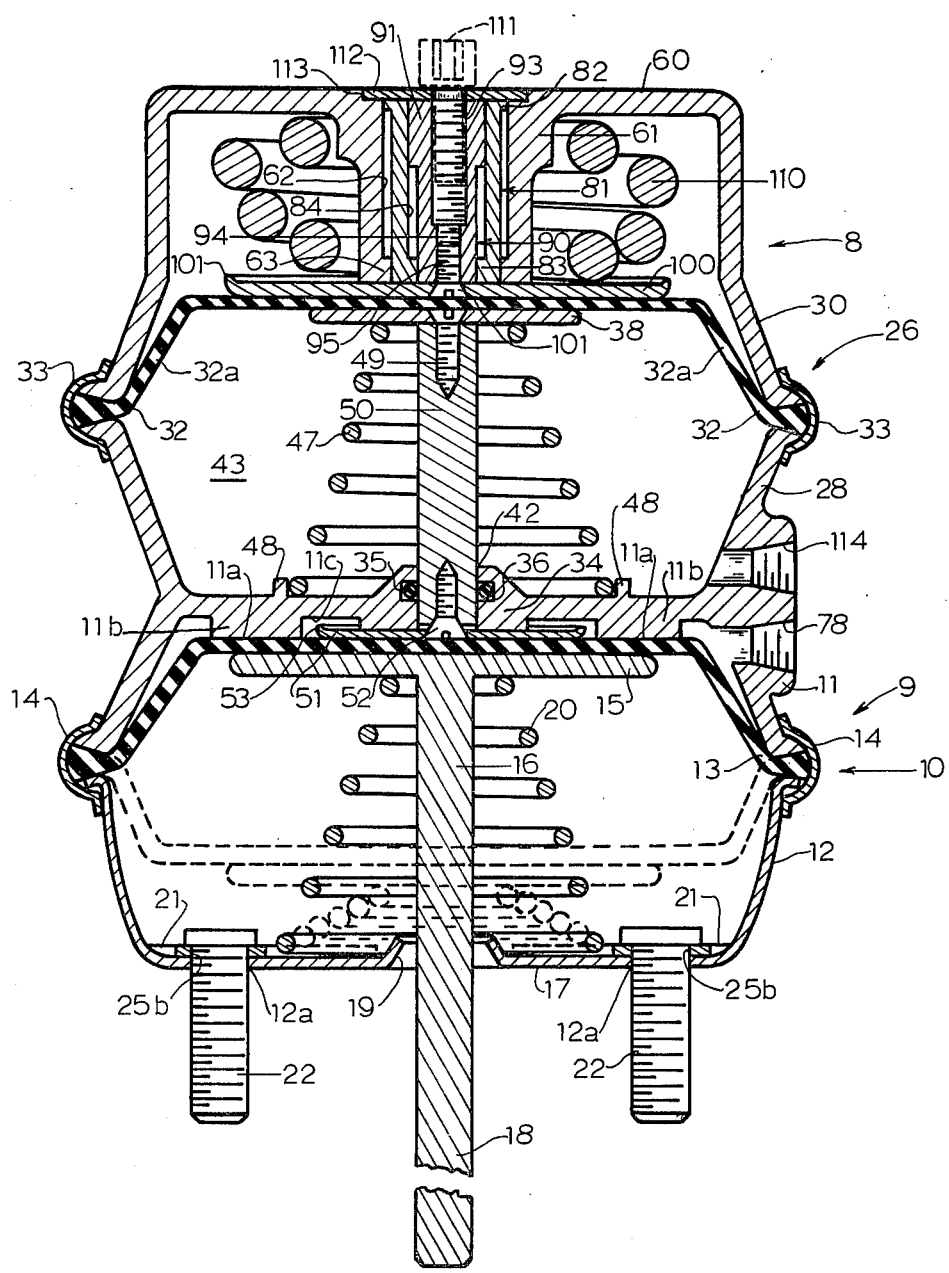
FIG. 1 is a longitudinal section through the air brake of the present invention showing the device in its inoperative position, with the braking position of the front diaphragm being indicated in dashed lines and also in dashed lines a short bolt used for assembly operations is illustrated.

Referring to the drawings, each of the brake units is formed of two portions, namely, the air brake 9 which is a slightly modified but substantially conventional unit, in combination with the auxiliary safety unit 8 which incorporates the novel mechanism of the present invention.

Brake unit 9 comprises an air brake cylinder 10 which is formed of two parts 11 and 12, each part being outwardly flanged to clamp between the flanges of these parts a rubber diaphragm 13. An annular band 14 is suitably shaped to conform to the flange portions of the cylinder parts for securing them in place and is held by a bolt arrangement 14a illustrated in FIG. 3.

Diaphragm 13 in its normal relaxed position is in the position shown in FIG. 1 wherein it contacts the inner wall surfaces 11a of part 11. A brake rod 16 carries at its inner end a circular plate 15 which is connected to rod 16 by welding or as a molded integral part, as illustrated. Plate 15 and diaphragm 13 are normally urged upwardly as seen in FIG. 1 by means of a compression spring 20 which is seated at one end against the bottom surface of plate 15 and at the other end against the interior wall of front plate 17 of part 12. In this inwardmost position of diaphragm 13, the diaphragm is in a relaxed condition. Brake rod 16 extends through an inwardly turned boss 19 in front wall 17 and is threadably connected at its outermost end 18 to a clevis, not shown, which is pivoted on a conventional brake arm, not shown.

Figure 2:
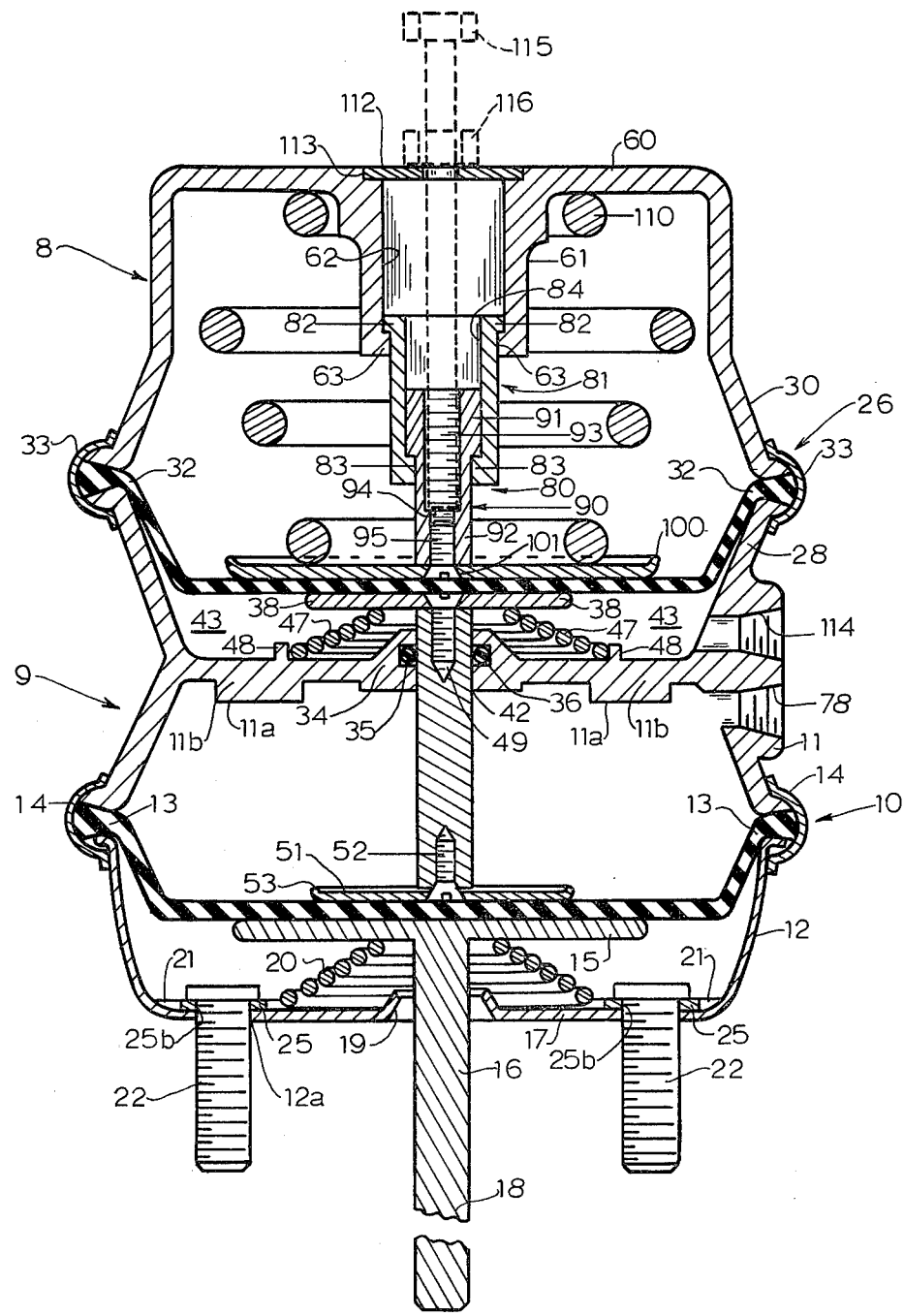
FIG. 2 is a view similar to FIG. 1 showing the air brake in its operative position and in dashed lines a bolt-nut arrangement used to retract the barrel spring.
Figure 3:
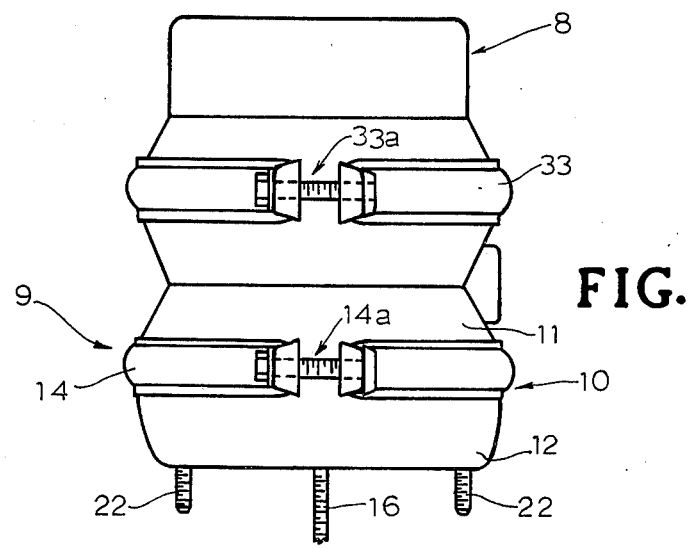
FIG. 3 is a reduced scale, side elevation view of an assembled air brake device of the type represented by the present invention.

Displacement of brake rod 16 downward as viewed in FIGS. 1–3 causes a displacement of the mentioned clevis in a consequent well-understood rocking motion of the brake arm to apply the brake. Actuation of the brake is accomplished by the introduction of fluid pressure through inlet 78 into brake cylinder 10 causing displacement of diaphragm 13 toward the front of cylinder 10 against the action of compression spring 20. Diaphragm 13 can be urged to any desired extent downward toward the front of cylinder 10 to apply whatever pressure is needed to operate the brake. In its distended position, diaphragm 13 takes a downward position indicated in FIG. 2 and in dashed lines in FIG. 1 of the drawings. Bolts 22 are provided and extend through front plate 17 of air cylinder 10 for attachment of the unit to the frame of the vehicle, not shown.

Figure 4:
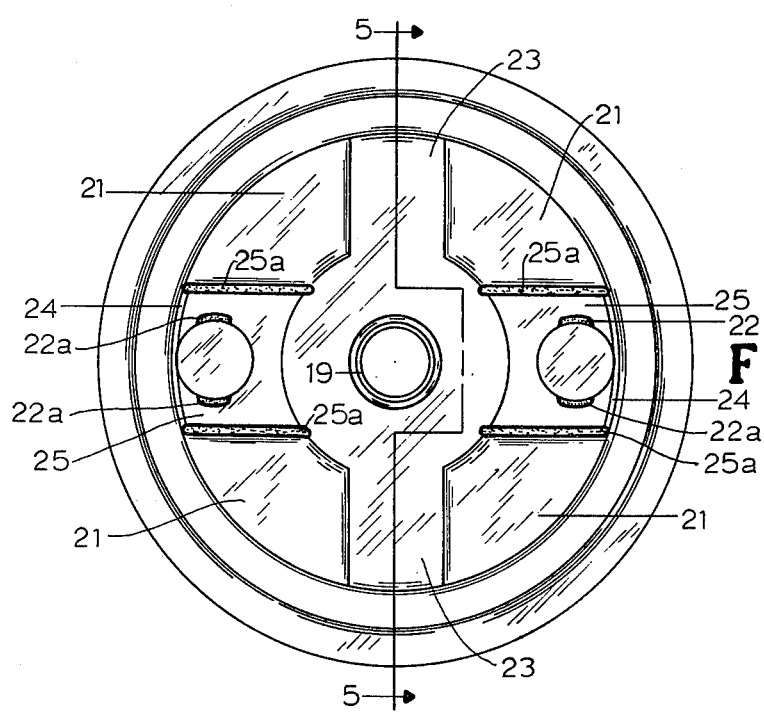
FIG. 4 is a top plan view of the lower housing portion.
Figure 5:
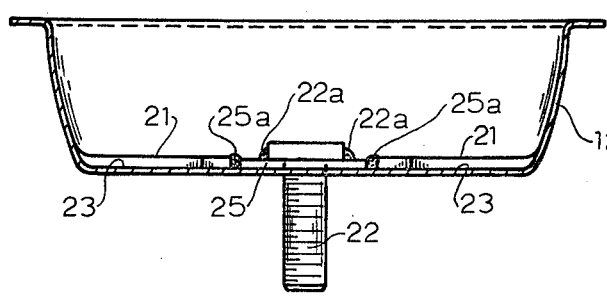
FIG. 5 is a section view taken substantially along line 5—5 of FIG. 4.

Since part 12 of cylinder 10 effectively operates at atmospheric pressure, it is relatively thin-walled as compared to the walls of part 11 but is otherwise made with sufficient strength and minimum weight to serve its intended purpose. Part 12 includes a boss 19 and a predetermined pattern of ridges 21 and valleys 23, 24 to increase the strength of the part. Valleys 24 are somewhat greater in width than valleys 23 as seen in FIG. 4 and receive a pair of reinforcing plates 25 which reside within valleys 24 between ridges 21. Reinforcing plates 25 are welded in place as illustrated by weld seams 25a. Bolts 22 pass through holes 25b in plates 25 and through holes 12a in part 12. Bolts 22 are welded in place on plates 25 as illustrated by weld seams 26. As previously mentioned, bolts 22 provide a means for attaching the unit to the frame of the vehicle. Also, ridges 21 and boss 19 provide a means for maintaining spring 20 in place within part 12 of cylinder 10. These modifications to part 12 provide a much stronger part and increase the safety of the unit.

Giving further consideration to part 11 of air brake cylinder 10, it will be noted that internal molded bosses 11b are provided on part 11 for added strength. Diaphragm 13, when in the relaxed position of FIG. 1, rests against the previously-mentioned surfaces 11a and is maintained in such position by a plate 15. A centrally located collar 34 integral with part 11 is provided with a hole 42 and extends below wall 11c but less than the extension of bosses 11b. An O-ring 35 is mounted within groove 36 in collar 34 and receives a slidable shaft 50 passing through hole 42 and which mounts at its lower end a wobble plate 51. Plate 51 is held in place on shaft 50 by a screw 52 which is recessed in plate 51 and screwed into the lower end of the shaft 50. It is desirable that plate 51 not fit tight against the lower end of shaft 50 even when screw 52 is tightened. Therefore, allowance is made for plate 51 to wobble on shaft 50. Plate 51 is formed from sheet metal and with a slightly upward turned edge 53 on the outermost portion thereof which operates free of contact with surrounding surfaces of bosses 11b. Plate 51 resides against the bottom surface of collar 34 with diaphragm 13 being arranged to contact the opposite side of plate 51. With this arrangement, it will also be noticed that the O-ring 35 prevents passage of any air between O-ring 35 and shaft 50 thereby rendering the interior 43 of front part 28 of auxiliary cylinder 26 fluid tight.

Auxiliary safety unit 8 to which the invention primarily relates is in the form of a cylinder 26 comprising a front part 28 and a rear part 30. The parts 28 and 30 are flanged to clamp therebetween a second rubber diaphragm 32 at its periphery employing an annular band 33 formed to clamp over the flange portions of the cylinder parts to secure the same in place by means of a suitable bolt arrangement 33a illustrated in FIG. 3. In the position of FIG. 1 diaphragm 32 is in its normal relaxed position and is mounted for axial displacement of centrally positioned shaft 50 in response to motion of diaphragm 32. Shaft 50 carries at its rear end a circular pressure plate 38 which is fixedly secured thereto by screw 49. Annular bosses 48 are formed on part 28 to provide an alignment for compression spring 47 which resides between pressure plate 38 and the upper interior wall surface surrounding collar 34.

Rear part 30 of cylinder 26 has a flat top surface 60 and an integrally formed, downwardly turned central collar 61 with a central bore 62 and an inwardly turned flange 63 at its lower end. Collar 61 receives the telescoping assembly 80 which is made up of intermediate tubular member 81 and inner tubular member 90. Intermediate member 81 is slidably received by collar 61 and has an outwardly projecting flange 82 which in the position of FIG. 2 rests in contact with flange 63 of collar 61 to provide a stop for intermediate member 81. Intermediate member 81 has a central bore 84 and an inwardly turned flange 83 at its lower end. Inner member 90 is designed to be slidably received by intermediate member 81 and has an enlarged upper section 91 which is slidable within bore 84 and which acts as a downward stop when it comes into contact with inward flange 83 of member 81. As best seen in FIG. 2, members 81 and 90 are limited in the amount of outward travel by contact of the flanges 82, 83 and in the amount of inward travel by contact of plate 100 with collar 61.

Inner member 90 has a pair of threaded bores 93, 94. Bore 93 is of larger diameter than bore 94 which is threaded to receive a screw 95. Screw 95, in turn, is passed through recessed hole 101 of plate 100 and is threaded into bore 94 until plate 100 is held firmly against inner member 90. Barrel spring 110 resides around collar 61 and at the top against the internal top surface of part 30 and at the bottom against plate 100. Collar 61 provides a stable guide for spring 110 in the FIG. 1 position and collar 61, intermediate member 81 and inner member 90 provide a stable guide for spring 110 in the FIG. 2 position. Plate 100 includes an upturned edge portion 101. At the factory, a relatively short threaded bolt 111, shown in dashed lines in FIG. 1, is used to assist in the installation of spring 110 into safety unit 8. In the plant, a press is used to compress spring 110 which allows plate 100 to be safely installed. Washer 112 is placed in recess 113 in top surface 60 and is retained therein by placement of a commercial-type glue between washer 112 and recess 113. Once spring 110 is compressed by the press, bolt 111 is screwed into threaded bore 93 and against washer 112 which maintains spring 110 in the compressed position of FIG. 1. However, when the air brake device is fully assembled as in FIG. 3, it can be shipped in the condition of FIG. 2 with bolt 111 removed.

With the foregoing description in mind, it can be seen that when the device of the invention is fully assembled, as depicted in FIG. 3, chamber 42 is pressurized by introducing fluid pressure through inlet 114 of auxiliary safety unit 8 which causes displacement of diaphragm 32 upward toward plate 11 in the FIG. 1 position. As long as sufficient pressure is maintained in chamber 43, spring 110 will remain in the FIG. 1 position. However, at anytime pressure in the system falls below some predetermined amount, spring 110 overcomes the pressure in the system and forces diaphragm 32 into the position of FIG. 2 which, in turn, forces plate 38, shaft 50, spring 47, plate 51, diaphragm 13, plate 15, spring 20 and brake rod 16 downward. In an emergency situation, the position of the parts in FIG. 2 is assumed. The brakes are applied to stop the vehicle and maintain it in a stopped position until spring 110 is reset.

Spring 110 may be reset while the vehicle is on the road by using bolt 115 and nut 116. Once the FIG. 2 position is assumed, nut 116 is backed off and bolt 115 is threaded into bore 93 as far as possible after which nut 116 may be tightened by a suitable wrench. It will be observed that in this operation tightening of nut 116 on threaded bolt 115 will cause plate 100, inner member 90, intermediate member 81 and spring 110 to move upward until the FIG. 1 position is reached and spring 110 can be maintained in this position with safety while necessary repairs are accomplished on the remainder of the device. That is, even though the two annular bands 14 and 33 are completely removed, spring 110 will be held in a safe position by means of the now tightened bolt 115. However, once necessary repairs have been made and the device of the invention is again fully assembled, as in FIG. 3, nut 116 can be rotated so as to allow threaded bolt 115 to relax spring 110 to the position of FIG. 2.

From the foregoing description, it can be seen that many advantages are derived from the described telescoping arrangement. First, in the event of a need to repair the device of the invention on the road, the spring 110 can be drawn into a compressed but safe position by using the bolt 115, nut 116 arrangement previously described. This operation can, of course, be performed on the road simply by carrying one such bolt and nut arrangement along with a tool kit. Further, the described telescoping arrangement allows the auxiliary safety unit 8 to be built with a relatively flat outer surface and enables the same threaded bore which receives bolt 115 to also, during factory assembly, receive the previously mentioned bolt 111 to facilitate assembly. Also of importance to the invention is the fact that very positive inward and outward limits of travel are provided thus providing additional safety and prevention of premature release of the barrel spring 110 particularly during maintenance and repair operations.

Also to be recognized is that the telescoping mechanism of the invention, illustrated in the drawings in conjunction with the auxiliary safety unit 8, can be employed in combination with any type of conventional fluid pressure brake. A representative type being illustrated by the main air brake 9 of the drawings. Thus, for example, the safety mechanism 8 of the invention can be employed in association with a conventional air brake unit employing a piston instead of the diaphragm arrangement of air brake 9. Further, it will be understood that the auxiliary safety brake 8 of the drawings can be manufactured and sold as a separate unit for mounting in operative association with any type of conventional fluid pressure air brake and in the manner previously described and conventionally applied to each wheel.

Although the auxiliary safety mechanism of the invention is intended to and does operate automatically in the event of an unsafe reduction of air pressure in the main brake cylinder, it is also recognized that a separate hand valve can be provided in the vehicle cab for independently controlling the air pressure in the auxiliary chamber. Thus, the driver of the vehicle can operate such a hand valve at anytime to vent the auxiliary chamber so as to operate the auxiliary safety brake 8 as a parking brake. Such a separate hand valve could also be operated to produce extra braking force in the event of low air pressure. In any event, in the event of any kind of failure in the overall system, the telescoping mechanism of the invention is of particular value in allowing the barrel spring 110 to be compressed to an inoperative and safe position for repairs and general overall. Moreover, for normal operation, the telescoping mechanism of the invention provides a very positive inward and outward guide for the barrel spring and also positive limits to inward and outward travel. Additionally, the relative smooth outer top housing surface, i.e., surface 60, enables the brake mechanism to be readily installed with minimum interference with surrounding structure on the vehicle. Also, likelihood of damage is reduced since there are no protrusions from the outer top housing surface as required in prior art safety brake mechanisms.

What is regarded as particularly significant is that the three telescoping guide members, i.e., collar 61, tubular member 81, and tubular member 90, provide a substantially safer and more reliable safety brake mechanism than heretofore found in the prior art. Also, to be noticed is that the guide member 81 is stabilized by means of flanges 82 and 83 and guide member 90 is stabilized by the body portion 91 and flange 83. Thus, both in retracting and extending motions, the stability of the barrel spring 110 is assured and there is essentially no opportunity for it to become cocked and inoperative.

What is claimed is:

1. A brake mechanism, comprising:
   (a) a first housing;
   (b) a first hollow guide member fixedly positioned at an inner end to and oriented axially within said housing and having an internal annular flange at the outer end thereof;
   (c) a second hollow guide member slidably mounted in said first guide member and having a body portion providing an external flange at its inner end adapted to engage said first guide member internal flange during and to limit outward travel of said second guide member, said second guide member also having an internal annular flange at the outer end thereof;
   (d) a third guide member having threaded bores at opposite ends thereof and slidably mounted in said second guide member, said third guide member having an external annular flange at one end adapted to engage the internal flange of said second member;
   (e) a first compression spring in said first housing positioned about said guide members;
   (f) a first plate member fixedly secured by threaded securing means mounted in the outer end and threaded bore of said third guide member and adapted to limit the axial movement of said first compression spring when said second and third guide members are fully extended outwardly from said first guide member with the respective external and internal annular flanges thereof engaged;
   (g) a first flexible diaphragm mounted within said first housing below said first plate member;
   (h) a second housing positioned outwardly from said first diaphragm;

(i) means for detachably securing said first and second housings and securing said first diaphragm therebetween;
(j) a central wall spanning and dividing the interior of said second housing;
(k) a shaft member slidably mounted for axial and air-sealed movement through said central wall;
(l) a second plate member secured to an end of said shaft member adjacent said first diaphragm;
(m) a second compression spring positioned about said shaft member and bearing on one end against said second plate member and on the opposite end against one inner side of said central wall;
(n) a third plate member secured in a limited wobble relation to an outer end of said shaft member passing through said central wall and located on an opposite outward side thereof;
(o) means for admitting a pressurized fluid into said second housing in the space below said first diaphragm;
(p) a second diaphragm secured outwardly of said second housing central wall and outwardly of said third plate member;
(q) a third housing positioned outwardly of said second diaphragm;
(r) means for detachably securing said second and third housings and securing said second diaphragm therebetween;
(s) a fourth plate member positioned outwardly from said second diaphragm;
(t) a brake rod integrally secured to said fourth plate member and extending axially from said fourth plate member through an opening in the outer wall of said third housing;
(u) a third compression spring positioned about said brake rod and bearing on one end against said fourth plate member and on an opposite end against an internal surface portion of said third housing; and
(v) means for admitting a pressurized fluid into the space within said second housing between said central wall and said second diaphragm,
whereby so long as pressure is maintained at some predetermined safe value in the space between said first diaphragm and said central wall, said first compression spring is maintained in a compressed state with said first plate member bearing against the outer end of said first guide member and with said second and third guide members nested therein completely within the confines of said first housing and with said first diaphragm held pressed against said first plate member by said second plate member, said second diaphragm held pressed against said third plate member by said fourth plate member, with said brake rod retracted and said second and third compression springs expanded respectively within the space inwardly and outwardly of said central wall and wherein upon loss of pressure of the appropriate value in the space between said first diaphragm and said central wall, said first compression spring acts to force said brake rod outwardly with the outwardly extent of travel and the outwardly extent of expansion of said first compression spring being limited by the respective guide members annular flanges engaging and thereby restricting such outward travel of said first compression spring and brake rod.

2. A brake mechanism as claimed in claim 1 wherein said third guide member threaded bore at its inner end is adapted to receive first bolt means during factory assembly after said first plate member, first compression spring and guide members are assembled to retain said first compression spring in a compressed state in said first housing during assembly and being further adapted to receive other bolt means of greater length adapted to engage the threaded bore of the inner end of said third guide member when said second and third guide members are fully extended and with said other bolt means having threaded nut means thereon which can be tightened so as to retract said first compression spring into its compressed state for purposes of maintenance, overhaul and the like.

3. A safety brake mechanism, comprising:
(a) a barrel spring assembly including:
 (i) a housing having an opening;
 (ii) a first hollow guide member aligned with said opening and fixedly positioned at an inner end to an oriented axially within said housing and having an internal annular flange at the outer end thereof;
 (iii) a second hollow guide member slidably mounted in said first guide member and having a body portion providing an external flange at its inner end adapted to engage said first guide member internal flange during and to limit outward travel of said second guide member, said second guide member also having an internal annular flange at the outer end thereof;
 (iv) a third guide member having threaded bores at opposite ends thereof and slidably mounted in said second guide member and having an external annular flange at one end adapted to engage the internal flange of said second guide member and a plate member secured to the other end of the third guide member;
 (v) a coil high compression barrel spring positioned in said housing about said guide members, said third guide member being adapted during factory assembly to receive through said opening and in said threaded bore at its inner end first bolt means after said plate member, coil high compression barrel spring and guide members are assembled to retain said coil high compression barrel spring in a compressed state in said housing during assembly and being further adapted when said second and third guide members are fully extended to receive through said opening and in said threaded bore at its inner end other bolt means of greater length having threaded nut means thereon bearing on the outside of said housing around said opening enabling said coil high compression barrel spring to be retracted into its compressed state for purposes of maintenance, overhaul, and the like; and
 (vi) said plate member being fixedly secured by threaded securing means mounted in the outer end and threaded bore of said third guide member and adapted to limit the axial movement of said coil high compression barrel spring when said second and third guide members are fully extended outwardly from said first guide member with the respective external and internal annular flanges thereof engaged; and
(b) fluid pressure braking means adapted to be attached to said housing and including means associated with said barrel spring assembly enabling said coil high compression barrel spring to be maintained in a compressed state with said plate member bearing against the outer end of said first guide member dependent on some predetermined safe value of air pressure maintaining said coil high compression barrel spring so compressed and being operative upon loss of such pressure to allow said coil high compression barrel spring to expand outwardly with the outwardly extent of travel of said coil high compression barrel spring being limited by the respective guide members annular flanges engaging and thereby restricting such outward travel of said coil high compression barrel spring.

* * * * *

UNITED STATES PATENT OFFICE
CERTIFICATE OF CORRECTION

Patent No. 4,263,840          Dated April 28, 1981

Inventor(s) Dan B. Herrera

It is certified that error appears in the above-identified patent and that said Letters Patent are hereby corrected as shown below:

Col. 2, line 18, after "normally" insert --extremely--.

Col. 3, line 9, after "diaphragm 13" insert --downward--.

Col. 6, line 10, "overall" should be --overhaul--.

Col. 8, line 18, "an" should be --and--.

Signed and Sealed this

First Day of September 1981

[SEAL]

Attest:

Attesting Officer

GERALD J. MOSSINGHOFF

Commissioner of Patents and Trademarks